(12) United States Patent
Viloria et al.

(10) Patent No.: US 9,074,122 B2
(45) Date of Patent: Jul. 7, 2015

(54) MITIGATION OF $H_2S$ IN STEAM INJECTION TECHNOLOGY USING AMINES OF NATURAL ORIGIN

(71) Applicants: Alfredo Viloria, Caracas (VE); Rafael Yoll, Edo. Miranda (VE); Yanine González, Edo. Miranda (VE); Mónica Román, Caracas (VE); José Biomorgi, Edo. Miranda (VE); Yefrenck Castro, Los Teques-Edo Miranda (VE)

(72) Inventors: Alfredo Viloria, Caracas (VE); Rafael Yoll, Edo. Miranda (VE); Yanine González, Edo. Miranda (VE); Mónica Román, Caracas (VE); José Biomorgi, Edo. Miranda (VE); Yefrenck Castro, Los Teques-Edo Miranda (VE)

(73) Assignee: Intevep, S.A., Caracas (VE)

( * ) Notice: Subject to any disclaimer, the term of this patent is extended or adjusted under 35 U.S.C. 154(b) by 261 days.

(21) Appl. No.: 13/767,051

(22) Filed: Feb. 14, 2013

(65) Prior Publication Data

US 2013/0213651 A1 Aug. 22, 2013

Related U.S. Application Data

(60) Continuation-in-part of application No. 13/269,394, filed on Oct. 7, 2011, now Pat. No. 8,641,922, which is a division of application No. 12/347,724, filed on Dec. 31, 2008, now Pat. No. 8,110,094.

(51) Int. Cl.
*C09K 8/54* (2006.01)
*E21B 43/24* (2006.01)
*B01D 53/14* (2006.01)
*C10L 3/10* (2006.01)

(52) U.S. Cl.
CPC . *C09K 8/54* (2013.01); *E21B 43/24* (2013.01); *B01D 53/1493* (2013.01); *C10L 3/10* (2013.01); *C10L 3/102* (2013.01); *B01D 53/1468* (2013.01); *B01D 2252/20478* (2013.01)

(58) Field of Classification Search
CPC .................................. C09K 8/54; E21B 43/24
USPC ........................................ 252/184; 166/272.3
See application file for complete search history.

(56) References Cited

U.S. PATENT DOCUMENTS

| | | | | |
|---|---|---|---|---|
| 4,171,349 | A * | 10/1979 | Cucuiat et al. | 423/574.2 |
| 4,522,263 | A * | 6/1985 | Hopkins et al. | 166/401 |
| 5,876,736 | A * | 3/1999 | Cohen et al. | 424/401 |
| 6,406,615 | B1 * | 6/2002 | Iwamoto et al. | 208/213 |
| 2003/0173081 | A1 * | 9/2003 | Vinegar et al. | 166/272.1 |
| 2004/0167037 | A1 * | 8/2004 | Davidson | 507/100 |
| 2005/0252833 | A1 * | 11/2005 | Doyle et al. | 208/390 |
| 2006/0135629 | A1 * | 6/2006 | Abbott et al. | 518/702 |
| 2006/0231455 | A1 * | 10/2006 | Olsvik et al. | 208/62 |
| 2006/0272813 | A1 * | 12/2006 | Olsvik et al. | 166/272.3 |
| 2009/0194280 | A1 * | 8/2009 | Gil et al. | 166/267 |
| 2009/0247560 | A1 * | 10/2009 | Ando et al. | 514/278 |
| 2010/0015220 | A1 * | 1/2010 | Wetterau et al. | 424/452 |

FOREIGN PATENT DOCUMENTS

CA 2451926 A1 * 6/2005

OTHER PUBLICATIONS

Brinker et al. State Chemistry Laboratory, Werribee, 1995.*
Takeshi et al.. Agr. Bio. Chem. vol. 32, p. 1306-1309, 1968.*

* cited by examiner

*Primary Examiner* — Nicole M Buie-Hatcher
*Assistant Examiner* — M. Reza Asdjodi
(74) *Attorney, Agent, or Firm* — Bachman & LaPointe, PC

(57) ABSTRACT

A method for mitigation of $H_2S$ during a steam injection hydrocarbon producing process includes the steps of injecting steam and an additive comprising soluble molasses condensate (SMC) and amines of natural origin into a steam injection well; and producing hydrocarbons from a hydrocarbon producing well in subterranean fluid communication with the steam injection well, wherein the additive reduces $H_2S$ content in the hydrocarbon produced from the hydrocarbon producing well.

14 Claims, 4 Drawing Sheets

MITIGATION OF H₂S IN STEAM INJECTION TECHNOLOGY USING AMINES OF NATURAL ORIGIN

CROSS-REFERENCE TO RELATED APPLICATION

This application is a continuation-in-part of co-pending U.S. patent application Ser. No. 13/269,394, filed Oct. 7, 2011, which is a divisional application of U.S. patent application Ser. No. 12/347,724 which was filed on Dec. 31, 2008, now U.S. Pat. No. 8,110,094.

BACKGROUND OF INVENTION

This disclosure relates to mitigation of hydrogen sulfide or acid gas which can frequently be formed during steam injection hydrocarbon producing processes.

During the production of hydrocarbons from subterranean formations, steam injection wells are frequently used in order to drive fluids toward a hydrocarbon producing well. In this way, steam injection increases production and therefore serves an important purpose.

However, while increasing production, the added steam combined with temperature and formation conditions leads to formation of unacceptable amounts of $H_2S$.

Since this $H_2S$ is both highly toxic and corrosive to equipment, the need exists for a suitable method for removing or otherwise preventing formation of the $H_2S$.

It is the goal of the present disclosure to provide such a method.

SUMMARY OF INVENTION

The present disclosure details a method for mitigation of hydrogen sulfide or acid gas which can typically be formed during steam injection processes. The mitigation is accomplished by including an additive during the steam injection, wherein the additive comprises amines of natural origin, and these amines provide an excellent reduction of the levels of $H_2S$ formed. Sources of the natural amines include waste streams from fish processing and also residue from sugar processing in the form of soluble molasses condensate (SMC). A combination of these two substances has been found to produce an excellent reduction in formation of $H_2S$, and also an improvement in the API gravity of hydrocarbons produced.

In accordance with the invention, a method for mitigation of $H_2S$ during a steam injection hydrocarbon producing process is provided, comprising the steps of injecting steam and an additive comprising soluble molasses condensate (SMC) and amines of natural origin into a steam injection well; and producing hydrocarbons from a hydrocarbon producing well in subterranean fluid communication with the steam injection well, wherein the additive reduces $H_2S$ content in the hydrocarbons produced from the hydrocarbon producing well.

In accordance with a preferred embodiment of the present invention, the additive preferably comprises soluble molasses condensate and fish processing residue, and the fish processing residue preferably contains histamine and amines such as methyldiethanolamine (MDEA), monoethanolamine (MEA) and diethanolamine (DEA), and these substances mixed with soluble molasses condensate (SMC) have been found to be particularly effective at mitigating $H_2S$ in accordance with the invention.

BRIEF DESCRIPTION OF THE DRAWINGS

A detailed description of preferred embodiments of the present disclosure follows, with reference to the attached drawings, wherein.

DETAILED DESCRIPTION

The disclosure relates to steam injection oil producing processes, and more particularly to an additive and method for mitigating formation of $H_2S$ during such steam injection processes.

Figure 1:
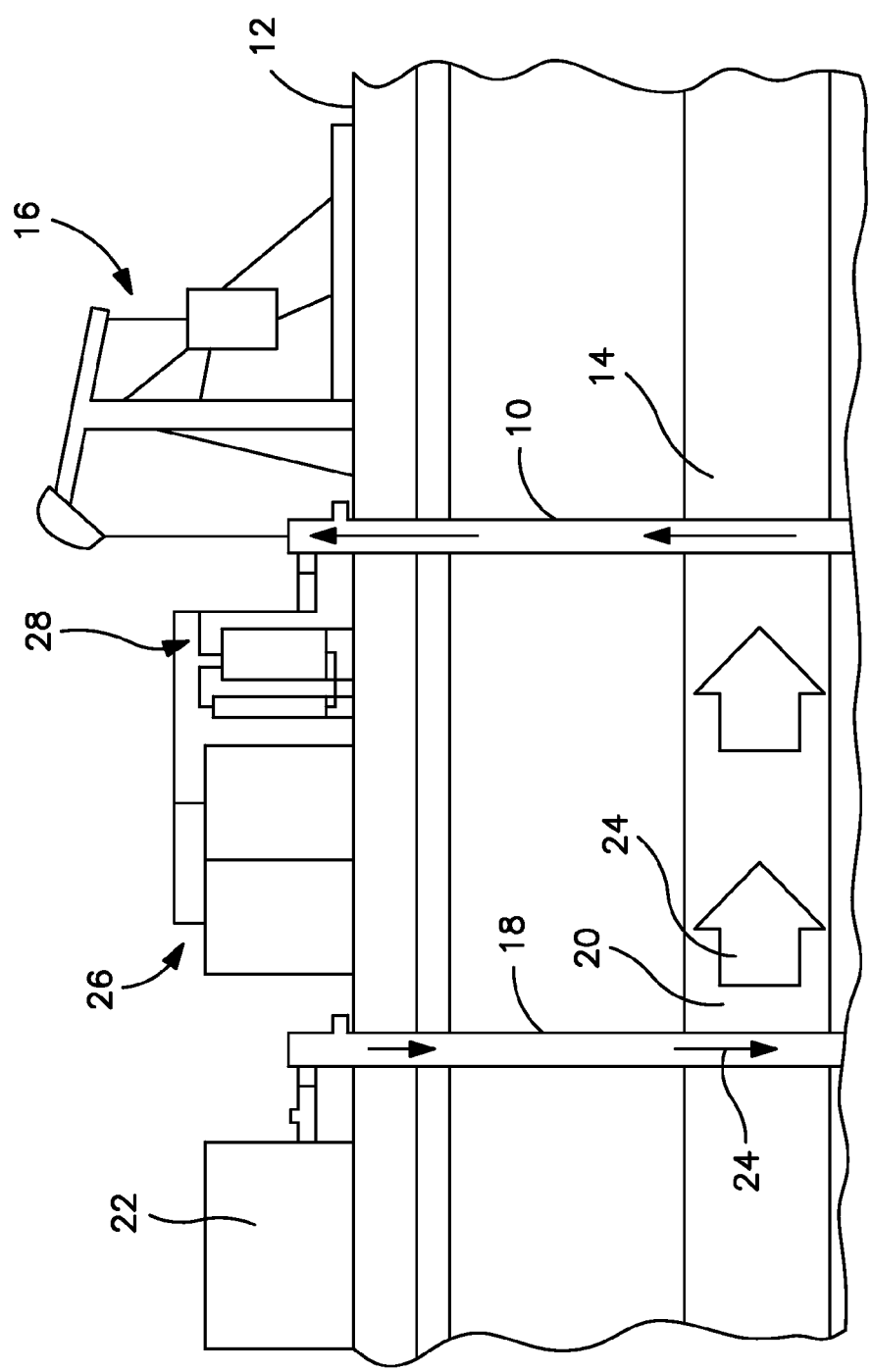
FIG. 1 is a schematic illustration of a steam injection process.

FIG. 1 illustrates a typical steam injection process, and shows a producing well 10 drilled from a surface level 12 to a producing zone 14. A pump 16 is also shown and is typically used for enhancing the volume or flow rate of fluids produced from well 10.

In order to further increase production from well 10, a steam injection well 18 is also drilled from surface 12 to a zone 20 which is in fluid communication with hydrocarbon zone 14. Steam generator 22 is used to generate steam to be injected into well 18, resulting in steam and condensed water in zone 20, which migrates as hot water 24 toward zone 14 and the crude oil in that zone. The increased temperature as well as fluid dynamic pressure from steam injection well 18 serves to help produce crude oil through well 10 as desired. Fluids produced from well 10 are passed to crude storage tanks 26 and a gas treatment unit 28, also as shown.

As set forth above, steam injection results in a reaction between organic sulfur compounds in the crude oil, sand present in the oil field itself, and steam at temperatures typically between 200 and 300° C. This reaction involves the breaking of chemical bonds by thermal effect of the steam and this reaction can be catalyzed by the minerals in the porous medium. The overall global mechanism is as follows:

$RCH_2CH_2SCH+2H_2O \rightarrow RCH_3+CO_2+H_2+H_2S+CH_4$

The $CO_2$, $H_2$ and $CH_4$ are all useful products, but $H_2S$ is highly toxic and corrosive. This undesirable byproduct of the steam injection process causes numerous issues and mitigation of this $H_2S$ is the goal of the present invention.

In accordance with the invention, it has been found that additives based on naturally occurring waste material, such as for example sugar cane and fish processing waste materials, can be added to the steam injection process and result in a reduction in $H_2S$ formed during the steam injection.

These additives, which are discussed further below, can be injected into the steam injection well 18, preferably before the steam injection. Further, when large amounts of $H_2S$ are produced, it may be desirable to inject additive according to the invention into production well 10 preferably after the steam injection.

In accordance with the present invention, the additive can be soluble molasses condensate (SMC), fish processing residues containing amines, and preferably combinations thereof. One preferred embodiment contains both SMC and amines from fish processing residue, as this combination produces excellent results as will be demonstrated below.

A number of different amines have been identified as useful for removing $H_2S$. These substances include monoethynolamine (MEA), diethanolamine (DEA) and methyldiethanolamine (MDEA). Boiling point and critical point of these amines are particularly well suited at removing $H_2S$ at well and formation conditions and forming benign products instead.

In accordance with the present invention, the effectiveness of amines in $H_2S$ mitigation is combined with finding a particularly good use for waste products from other industries as a source of the amines and other useful components to prevent the generation of hydrogen sulfide in the petroleum industry. SMC obtained from sugar refineries, and fish processing residue obtained from the fish processing industry, can act as sources of additive according to the invention, with SMC combining with amines of natural origin for use in accordance with the present invention, with surprisingly beneficial results.

Figure 2:
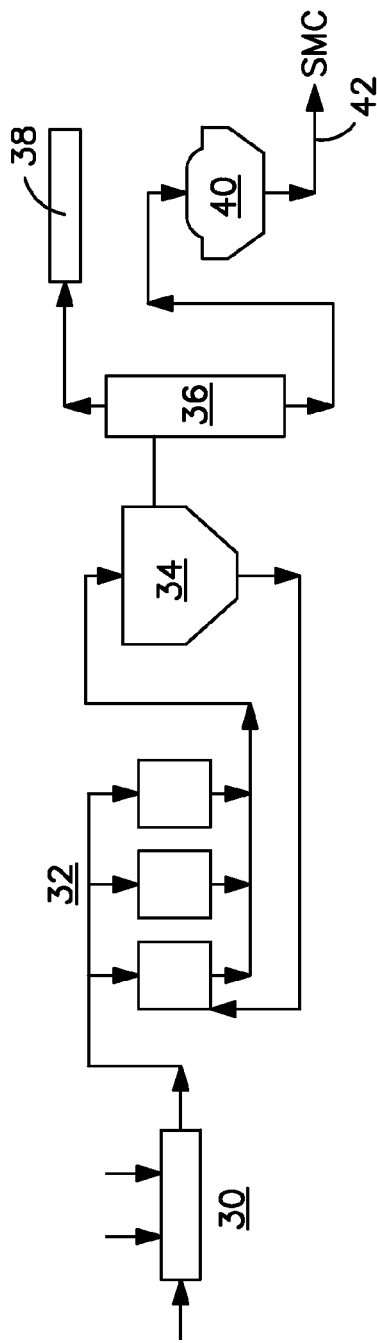
FIG. 2 is a schematic illustration of a typical process from which SMC can be obtained.

FIG. 2 schematically illustrates a process from which SMC can be obtained. This illustration is an example only, and SMC obtained from any source or by other methods would be suitable within the broad scope of the present invention.

Turning to FIG. 2, the process typically begins with a mixture of syrups 30 sent to a fermentation step 32, followed by separation of yeasts 34, and distillation 36 to produce ethanol 38 and a concentration of vinasse 40 which can then be used to obtain SMC 42 for use in accordance with the present invention.

Figure 3:
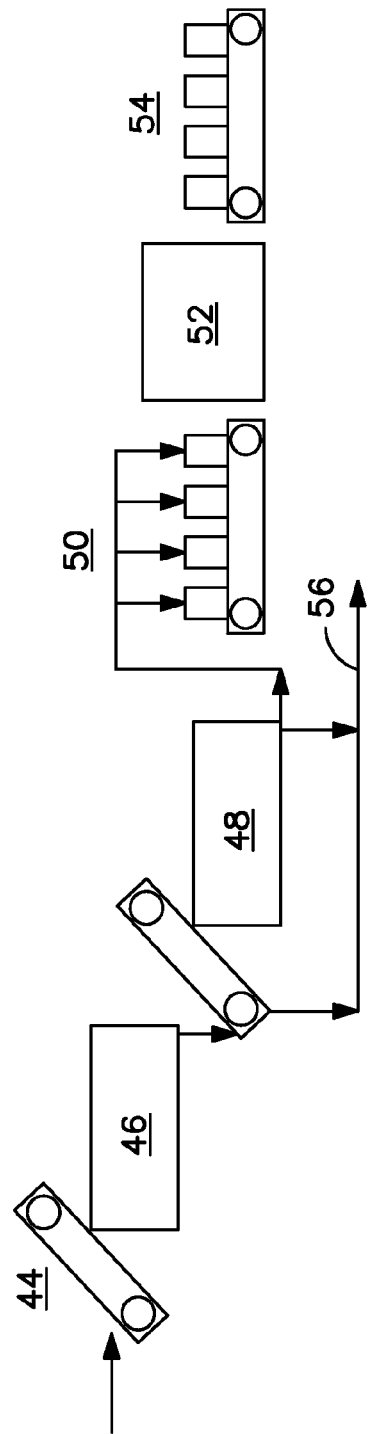
FIG. 3 is a schematic illustration of a typical process from which fish processing residues can be obtained.

FIG. 3 illustrates a typical fish processing method, and shows a beginning step as selection of fish 44, a washing step 46, a cooking step 48, a filling step 50 and, finally, vacuum sealing and sterilization 52 to provide the final fish product 54. As shown, the washing step 46 and cooking step 48 generate streams of residue 56 which contain useful amines. These amines are shown below to produce excellent results in mitigation of $H_2S$ in steam injection processes when used in accordance with the present invention.

With respect to SMC, compounds found and identified in the SMC are believed to contribute to the beneficial results obtained in accordance with the present invention. These compounds include carboxylic acids, lactones, alcohols, aldehydes, phenols and the like. It should be noted that the use of SMC is also disclosed in a related application by the present applicant, namely, U.S. patent application Ser. No. 12/347,724, filed Dec. 31, 2008, and that application is incorporated herein by reference.

With respect to the fish processing residue, histamine is a natural amine found in the tissues of fish such as tuna and mackerel and in residue from treatment of such fish. In such fish, histamine is indicative of decomposition. Histamine structure comprises various amines, typically a primary and two additional amines from the imidazolidinyl formed from decomposition, and the histamines are typically formed from a combination of histidine and bacteria. Histamines can be found in large quantity in the residue of fish processing, for example as obtained in FIG. 3 described above.

Regarding the invention, the additive can usefully be SMC, fish processing residue, and most preferably both, and can advantageously be used in a steam injection process as shown in FIG. 1 by injecting into steam injection well 18 before steam injection, and optionally into production well 10 after steam injection.

The additive preferably contains amounts of SMC and FPR sufficient to provide at least about 20% vol/vol amines and at least about 5% vol/vol of SMC. Further, the additive may contain a ratio of amines to SMC, by volume, of between about 1:4 and about 10:1, and preferably has a ratio of about 9:1.

In accordance with the present invention, in order to simulate steam injection with mitigation of $H_2S$ according to the invention, steam injection was conducted on an oil well located at Anzoátegui, VE. This oilfield has properties as shown below in Table 1.

TABLE 1

PROPERTIES IN THE OILFIELD

| Property | Value |
|---|---|
| Porosity, Ø, vol % | 27 |
| Saturation of crude oil, $S_o$ vol % | 73 |
| Gas/oil ratio, GOR, $ft^3$ N gas/bbl N crude oil | 79 |
| Concentration of $H_2S$ in the production zone, ppmv | 7000 |
| Concentration of $CO_2$ in the production zone, % v/v | 21 |

Steam injections were conducted at conditions as shown below in Table 2.

TABLE 2

STEAM INJECTION CONDITIONS

| Property | Value |
|---|---|
| Steam injection temperature (C. °) | 247 |
| Saturation pressure at the injection T, MPa | 3.79 |

Under these conditions, and in this well, a number of additives were determined to be evaluated, as detailed below in Table 3.

TABLE 3

ADDITIVES EVALUATED

| Property | Description |
|---|---|
| MDEA/SMC | Deionized Water: 47.5% v/v |
| | MDEA: 47.5% v/v |
| | SMC: 5% v/v |
| SMC/DEA | SMC: 80% v/v |
| | DEA: 20% v/v |
| Commercial Mixture (CM) | Liquid $H_2S$ Sequestering Agent |
| | Amine-based |
| | Film-forming |
| Fish Processing Residues (FPR) | Aqueous effluent obtained from the fishing industry |
| Histamine (HM) | Histamine from conventional synthesis, 5,000 ppm in deionized water |

As shown, the additives to be evaluated included combinations of MDEA/SMC and SMC/DEA in accordance with the invention, as well as a Commercial Mixture (CM), Fish Processing Residues (FPR) by itself, and a synthesized histamine (HM).

The injection water has properties set forth below in Table 4.

TABLE 4

INJECTION WATER

| Property | Value |
|---|---|
| pH (25° C.) | 10.68 ± 0.06 |
| Sodium, mg/l | 397.00 |
| Carbonate, mg/l | 468.00 |
| Chloride, mg/l | 575.00 |
| Sulfate, mg/l | 36.00 |
| Nitrate, mg/l | 20.40 |
| Potassium, mg/l | 100.00 |

Properties in the oilfield are shown below in Table 5.

TABLE 5

OIL IN THE OILFIELD

| Property | Value |
|---|---|
| API Gravity (15.56° C.) °API | 8.88 ± 0.06 |
| Viscosity (50° C.), Pa · s | 28.0 ± 0.6 |
| H/C ratio | 0.132 ± 0.033 |
| Saturates, % w/w | 9.5 ± 0.5 |
| Aromatics, % w/w | 36.5 ± 2 |
| Resins, % w/w | 37 ± 2 |
| Asphaltenes, % w/w | 17 ± 1 |
| Sulfur, % w/w | 3.36 ± 0.14 |
| Nickel, ppm | 95 ± 5 |
| Vanadium, ppm | 378 ± 20 |

The sand in the oilfield has properties as shown below in Table 6.

TABLE 6

SAND IN THE OILFIELD

| Property | Value |
|---|---|
| Carbon, % w/w | 1.19 ± 0.02 |
| Sulfur, % w/w | 0.44 ± 0.01 |
| Quartz, % w/w | 95 ± 2 |
| Potassium Feldespar, % w/w | 2.00 ± 0.04 |
| Calcite, % w/w | 1.00 ± 0.02 |
| Dolomite, % w/w | 2.00 ± 0.04 |
| Clays, % w/w | Trace |

The SMC used in this evaluation had properties as shown below in Table 7.

TABLE 7

SOLUBLE MOLASSES CONDENSATE (SMC)

| Property | Value |
|---|---|
| pH (25° C.) | 4.42 ± 0.05 |
| Brix | 70 ± 1 |
| Density (25° C.), g/cm$^3$ | 1.2411 ± 0.0005 |
| Solids in suspension, % w/w | 54.64 ± 0.05 |
| C, % w/w | 20 ± 1 |
| H, % w/w | 8 ± 2 |
| S, % w/w | 0.135 ± 0.01 |
| N, % w/w | 1.50 ± 0.05 |

The pH density content for each of the additives considered is shown below in Table 8.

TABLE 8

STEAM INJECTION ADDITIVES

| Additive | pH, 25° C. | Density, 25° C. (g/cm$^3$) | Active amine (% w/w) |
|---|---|---|---|
| MDEA/SMC | 10.54 ± 0.05 | 1.051 ± 0.005 | 47.5 ± 0.5 |
| SMC/DEA | 9.89 ± 0.05 | 1.078 ± 0.005 | 20.0 ± 0.5 |
| CM | 12.10 ± 0.05 | 1.013 ± 0.005 | 35.0 ± 0.5 |
| FPR | 6.82 ± 0.05 | 0.988 ± 0.005 | 3.6 ± 0.2 |
| HM | 10.7 ± 0.05 | 1.081 ± 0.005 | 1.0 ± 0.2 |

The composition of the effluent gas from the production process carried out with each of the additives being considered is shown below in Table 9.

TABLE 9

COMPOSITION OF THE EFFLUENT GAS

| M (g/mol) | Compound Gas (% mol) | CAV | +MDEA/SMC | +SMC/DEA | +CM | +FPR | +HM |
|---|---|---|---|---|---|---|---|
| 2 | H$_2$ | 0.8960 | 1.0510 | 0.2595 | 0.0000 | 0.2225 | 0.2798 |
| 16 | CH$_4$ | 54.8500 | 43.6660 | 78.9445 | 83.2060 | 69.5465 | 71.0848 |
| 28 | N$_2$ | 19.1240 | 43.0360 | 13.8020 | 11.9540 | 20.1630 | 18.167 |
| 32 | O$_2$ | 3.6210 | 5.1220 | 1.0525 | 2.0520 | 3.7220 | 4.2220 |
| 34 | H$_2$S | 0.5148 | 0.0514 | 0.0514 | 0.2574 | 0.3089 | 0.1214 |
| 44 | CO$_2$ | 21.4360 | 6.2770 | 5.8670 | 2.5860 | 6.3125 | 6.125 |
| $\overline{M}$ (g/mol) | | 24.74 | 23.46 | 19.42 | 18.45 | 20.75 | 20.55 |

In Table 9, CAV was a blank test or control against which the additives of Table 8 can be compared. The blank test used water, oil, gas and sand under steam injection conditions.

In addition to reduction of H$_2$S in the effluent gas which is further discussed below, Table 9 shows other benefits of the present invention as well. Table 9 shows higher resulting concentrations of H$_2$S and CO$_2$ than the other additives. The presence of additional H$_2$ from the water gas shift reaction can hydrogenate unsaturated centers present in the heavy fractions of crude oil.

Higher levels of CO$_2$ can also be beneficial when miscible with the oil as this reduces viscosity of the oil which increases flow and production rates.

Figure 4:
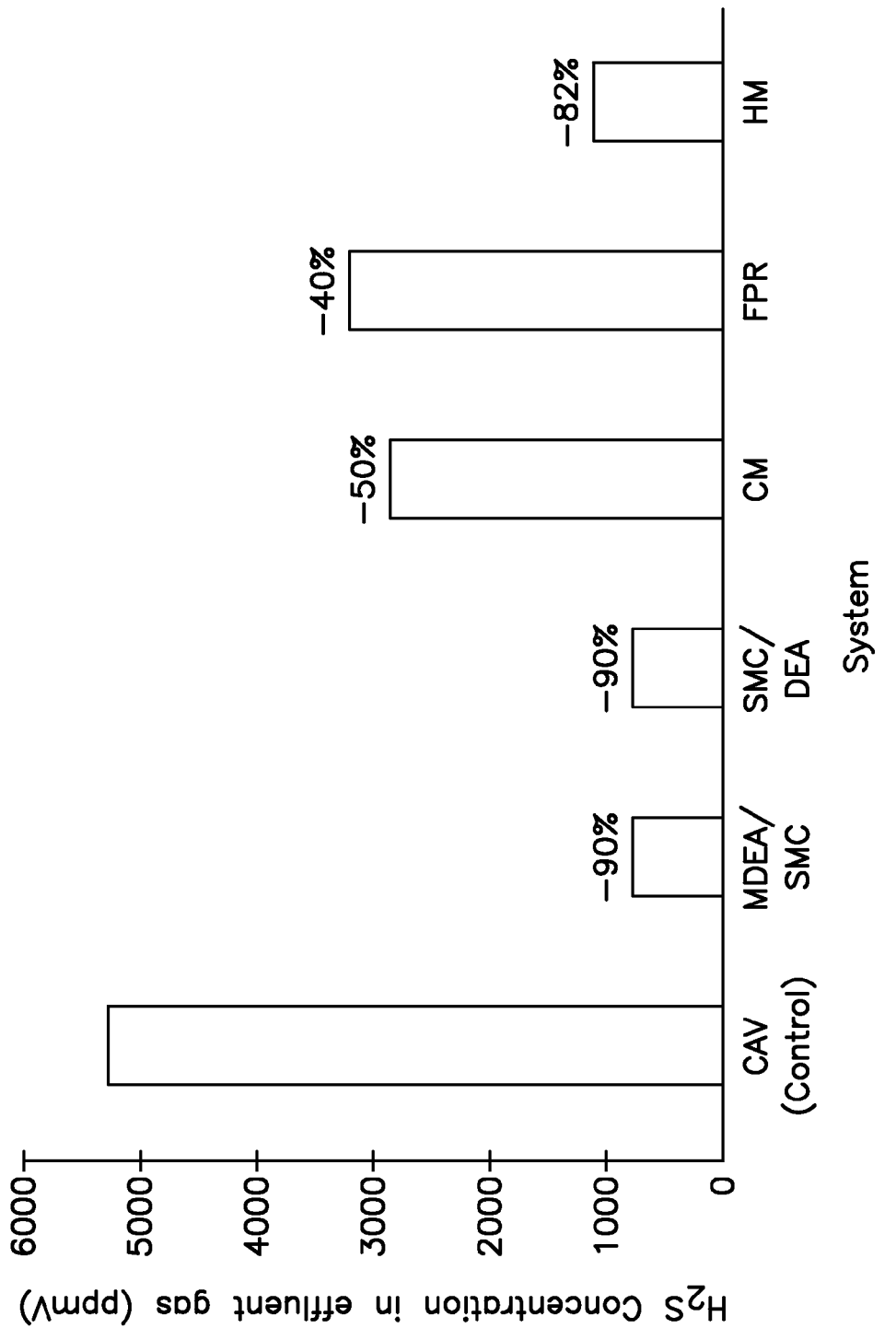
FIG. 4 illustrates results of a steam injection process using an additive in accordance with the present invention compared to a control or blank (CAV) with respect to generation of $H_2S$.
Figure 5:
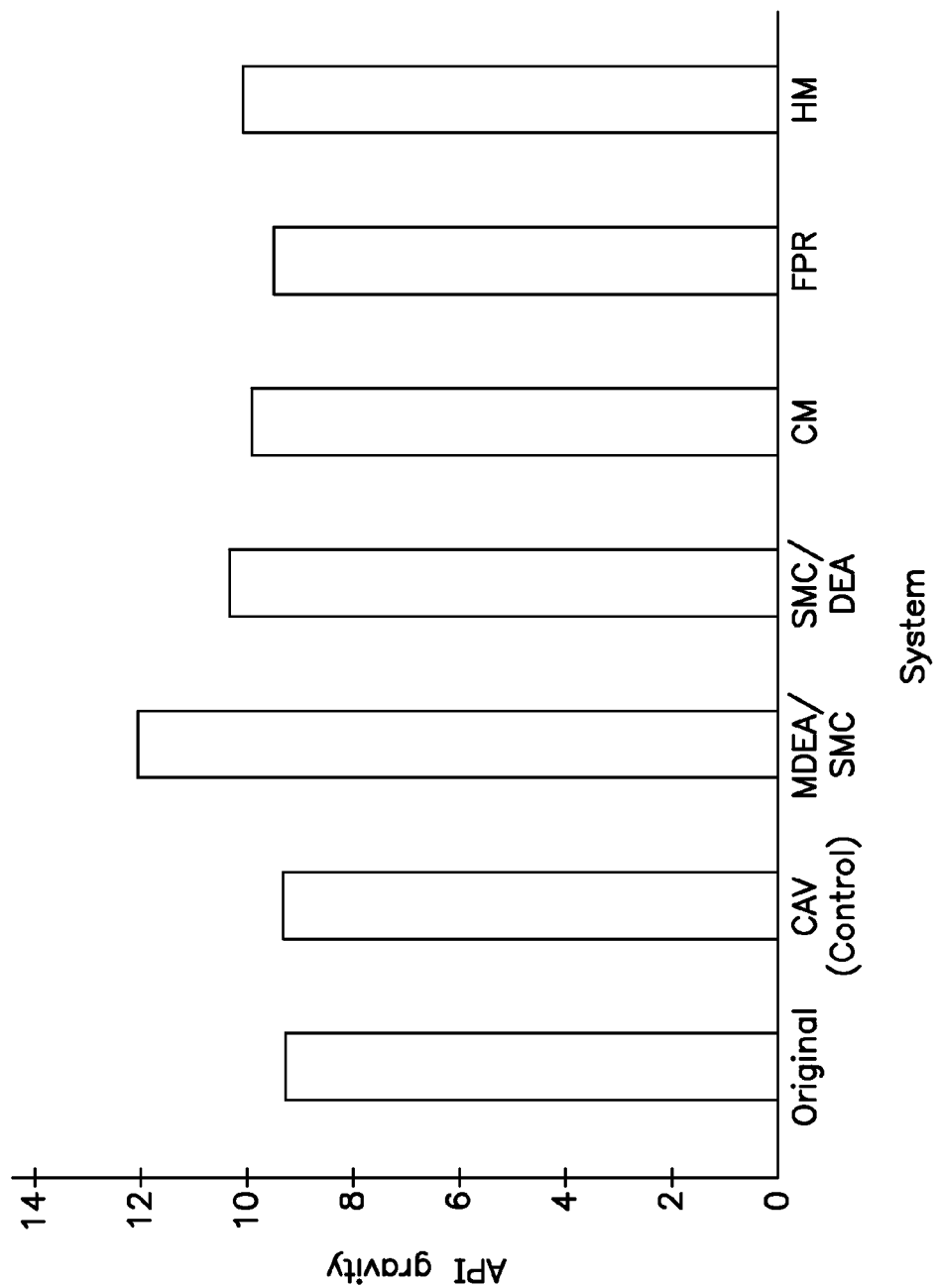
FIG. 5 illustrates results of a steam injection process using an additive in accordance with the present invention compared to a control or blank (CAV) with respect to API gravity of produced oil.

Effectiveness of the additive was also measured in terms of both hydrogen sulfide in the gas effluent and API gravity of the resulting produced crude. FIGS. 4 and 5 show these results.

FIG. 4 shows that the control generated a concentration of $H_2S$ of approximately 5,000 ppmv, while the additives in accordance with the present invention reduced this amount by approximately 90%, to a level below 1,000 ppmv. This compared extremely favorably with the commercial additive (CM) which showed only a 50% reduction, and to the fish processing residue (FPR) by itself, which showed a 40% reduction. Reduction was 82% for synthesized histamine (HM).

FIG. 5 also shows that the additive according to the most preferred embodiment of the invention (MDEA/SMC) shows an increase approximately in the API gravity of the oil produced, and this increase was greater than any change obtained using any other additives including the fish processing residue (FPR) by itself and synthesized histamine (HM).

While FIGS. 4 and 5 show beneficial results with MDEA/SMC, SMC/DEA and even HM, it is also clear that the best combination of results is obtained with MDEA/SMC in accordance with the invention.

It is to be understood that the present specification is not limited to the illustrations described and shown herein, which are deemed to be merely illustrative of the best modes of carrying out the present specification and which are susceptible of modification of form, size, arrangement of parts and details of operation. The present specification, i.e. the invention, rather is intended to encompass all such modifications which are within its spirit and scope as defined by the claims.

What is claimed is:

1. A method for mitigation of $H_2S$ during a steam injection hydrocarbon producing process, comprising the steps of:
    injecting steam and an additive comprising soluble molasses condensate (SMC) and amines of natural origin into a steam injection well, wherein the additive is injected in an amount between 0.01 PV and 20 PV, wherein PV refers to pore volume of the reservoir; and
    producing hydrocarbons from a hydrocarbon producing well in subterranean fluid communication with the steam injection well, wherein the additive reduces $H_2S$ content in the hydrocarbon produced from the hydrocarbon producing well.

2. The method of claim 1, wherein the soluble molasses condensate (SMC) contains carboxylic acids, lactones, alcohols, aldehydes, phenols and combinations thereof.

3. The method of claim 1, wherein the amines of natural origin are obtained from fish processing residue.

4. The method of claim 3, wherein the fish processing residue contains at least one of methyldiethanolamine (MDEA), monoethanolamine (MEA), diethanolamine (DEA) and combinations thereof.

5. The method of claim 3, wherein the additive further comprises histamine.

6. The method of claim 1, wherein the additive comprises water, methyldiethanolamine (MDEA) and soluble molasses condensate (SMC).

7. The method of claim 1, wherein the injection is carried out at a temperature of between 200 and 300° C.

8. The method of claim 1, wherein the additive has a pH of between 10 and 11 and a density at 25° C. of about 1.05 g/cm³, and contains active amines in an amount between 0.5 and 70% w/w.

9. The method of claim 1, wherein the hydrocarbon has an API gravity before production of less than about 7, and the hydrocarbon produced from the well has an API gravity of at least about 25.

10. The method of claim 1, further comprising the step of preparing the additive from waste products of sugar cane and fish processing.

11. The method of claim 1, wherein the injecting step comprises first injecting the additive into the steam injection well and then injecting the steam into the steam injection well.

12. The method of claim 11, further comprising the step of injecting the additive into the producing well after injecting the steam into the steam injection well.

13. A method for mitigation of $H_2S$ during a steam injection hydrocarbon producing process, comprising the steps of:
    injecting steam and an additive comprising soluble molasses condensate (SMC) and amines of natural origin into a steam injection well;
    producing hydrocarbons from a hydrocarbon producing well in subterranean fluid communication with the steam injection well, wherein the additive reduces $H_2S$ content in the hydrocarbon produced from the hydrocarbon producing well; and
    preparing the additive from waste products of sugar cane and fish processing.

14. The method of claim 13, wherein the additive is injected in an amount between 0.01 PV and 20 PV, wherein PV refers to pore volume of the reservoir.

* * * * *